A. TINKER.
HAY PRESS.
APPLICATION FILED FEB. 12, 1910.
1,005,903.
Patented Oct. 17, 1911.
4 SHEETS—SHEET 1.
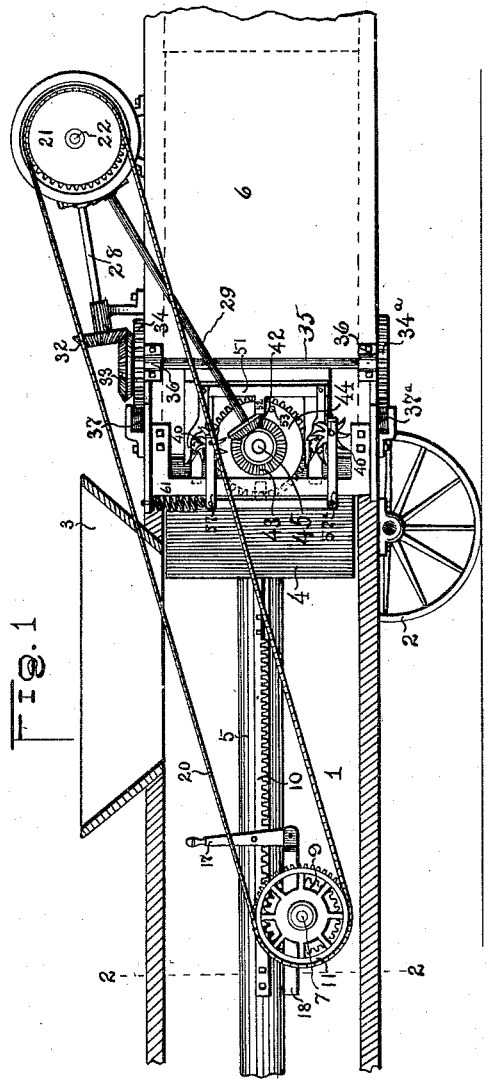
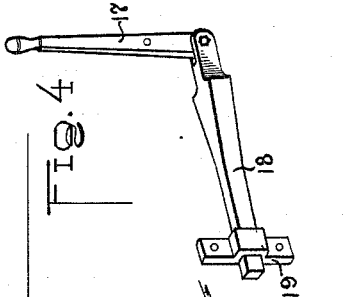
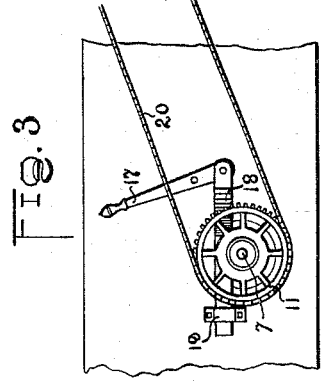
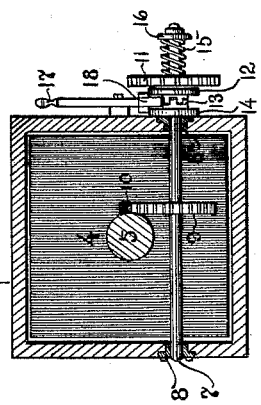
WITNESSES:
Gilbert H Greene
H. J. Jacobi
INVENTOR
Andy Tinker.
BY
W.J. Fitzgerald
ATTORNEYS.

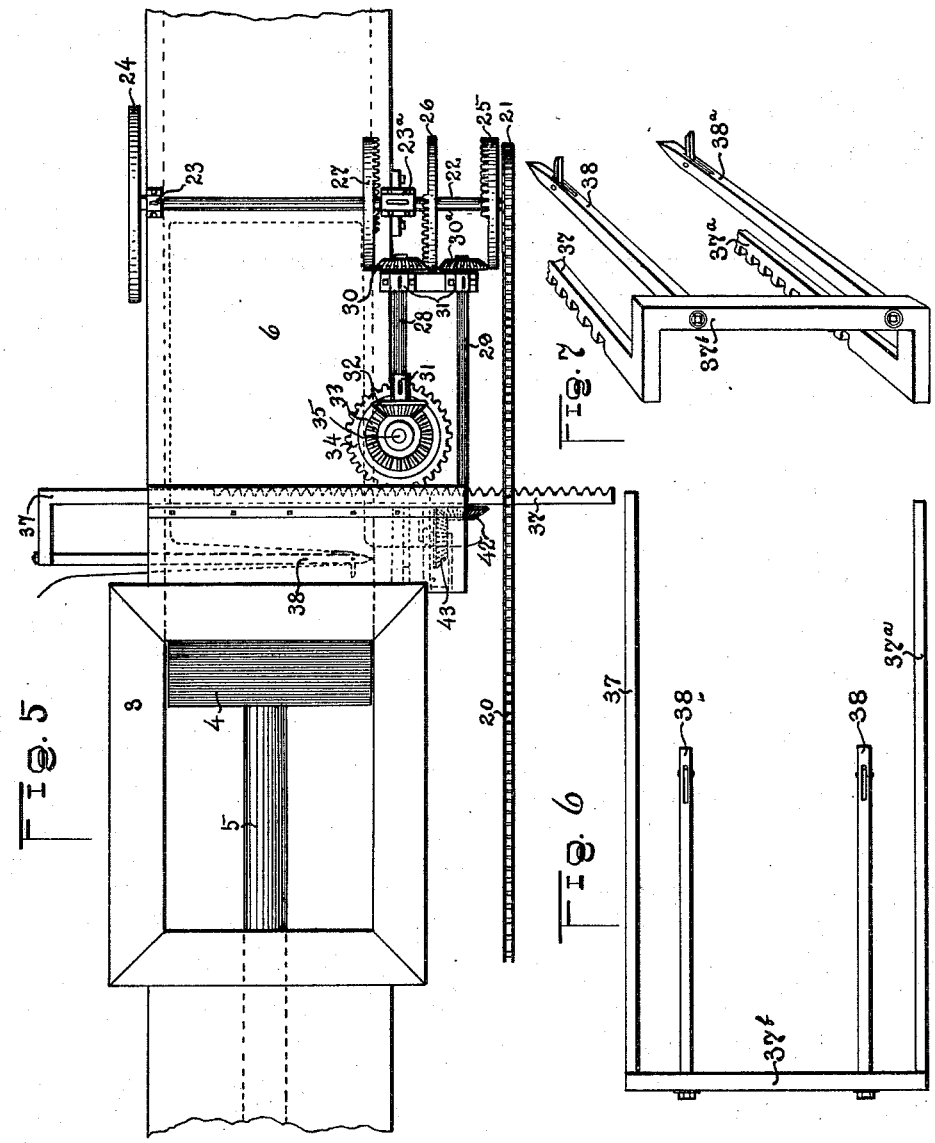

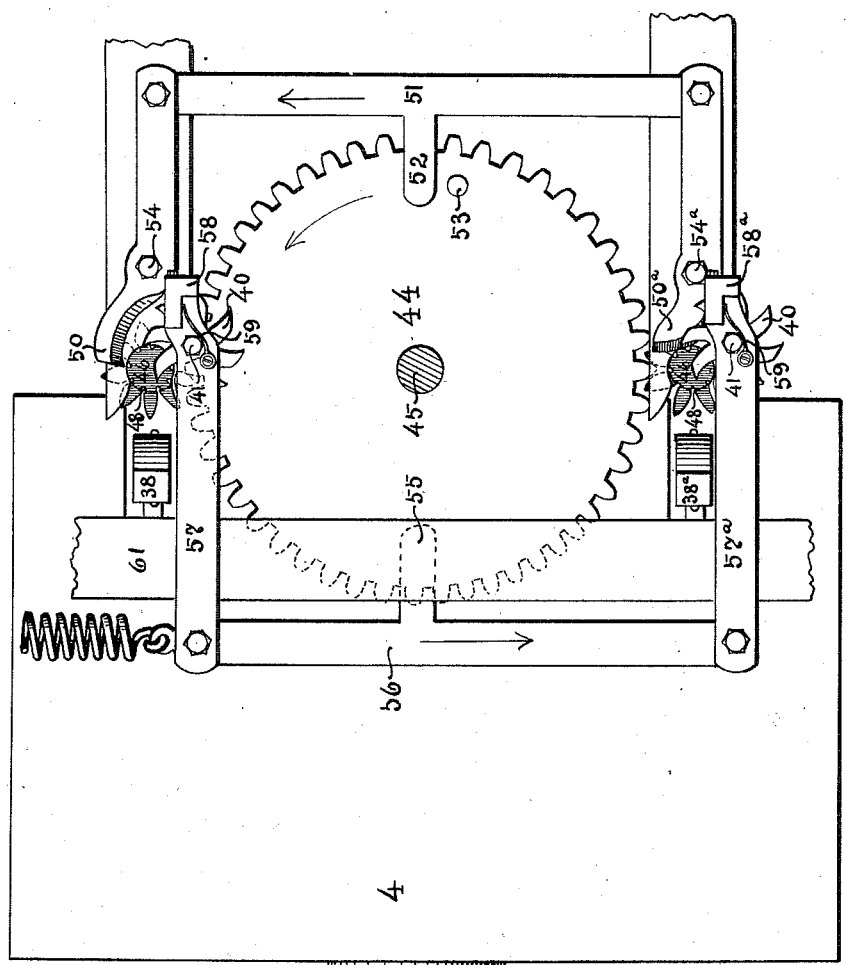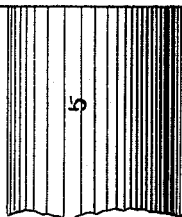

A. TINKER.
HAY PRESS.
APPLICATION FILED FEB. 12, 1910.
1,005,903.
Patented Oct. 17, 1911.
4 SHEETS—SHEET 4.
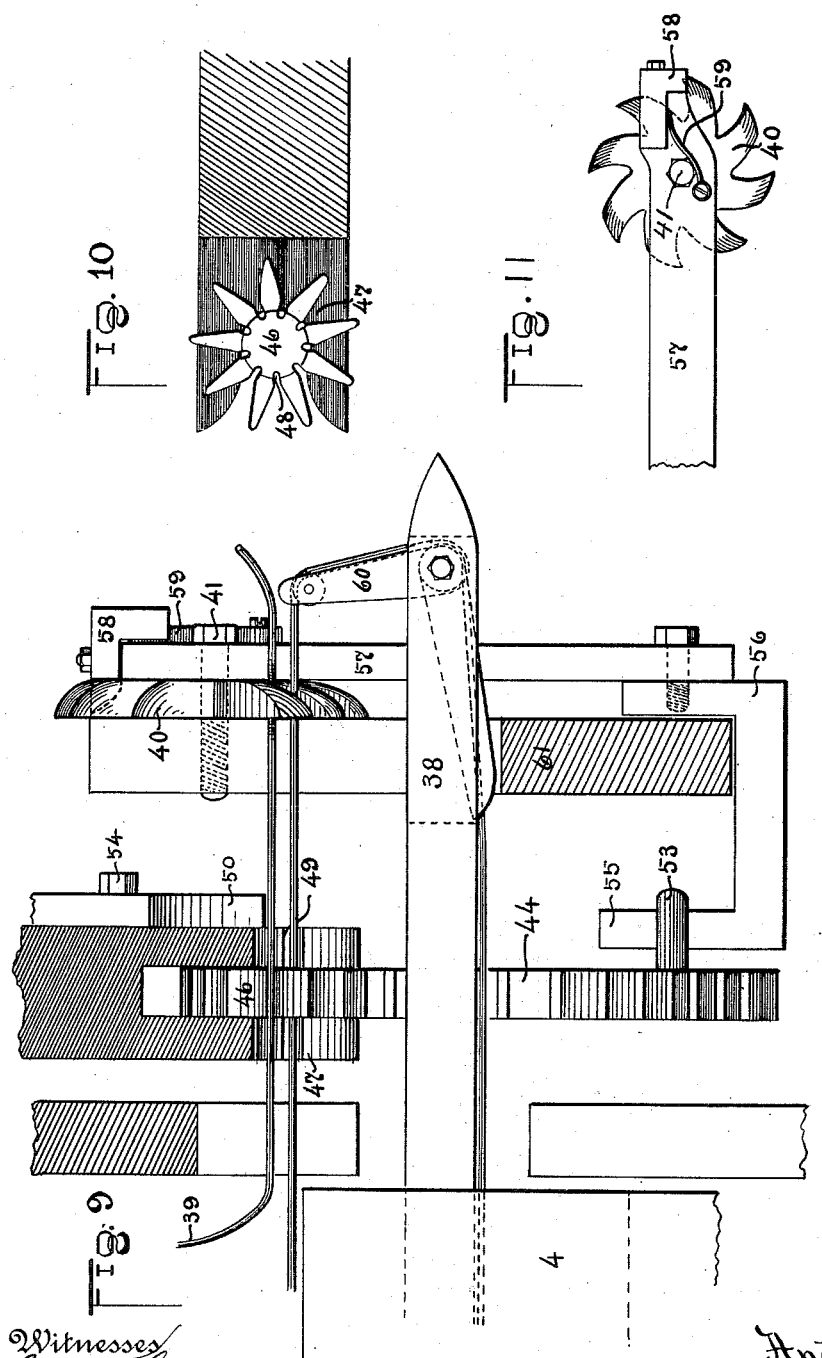

ABCDEFGHIJKLMNOPQRSTUVWXYZ

UNITED STATES PATENT OFFICE.

ANDY TINKER, OF STECKER, OKLAHOMA.

HAY-PRESS.

1,005,903.  Specification of Letters Patent.  Patented Oct. 17, 1911.

Application filed February 12, 1910. Serial No. 543,472.

*To all whom it may concern:*

Be it known that I, ANDY TINKER, a citizen of the United States, residing at Stecker, in the county of Caddo and State of Oklahoma, have invented certain new and useful Improvements in Hay-Presses; and I do hereby declare the following to be a full, clear, and exact description of the invention, such as will enable others skilled in the art to which it appertains to make and use the same.

My invention relates to new and useful improvements in attachments for hay presses and especially to the class adapted to tie wire around bales.

An object of my device is to provide a means for tying wire around a bale of hay and a still further object is to provide a mechanism for severing the wire after it has been securely tied in engagement with the bale.

A further object of my invention is to provide a means for controlling the tying mechanism in order that the same may be started or stopped.

A still further object of my device is to effectively position the wire around the bale for the purpose of tying said wire.

Another object of my invention is to provide a means for compressing hay in bales.

These and other objects will be hereinafter referred to and more particularly pointed out in the specification and claims.

In the drawings forming a part of this application, Figure 1 is a side elevation partly in section showing a baling machine with my improved form of tying mechanism coöperating therewith. Fig. 2 is a transverse section taken on the line 2—2, Fig. 1. Fig. 3 is a detail elevation showing the clutch mechanism for starting and stopping the tying devices. Fig. 4 is a detail elevation of a wedge shaped clutch lever. Fig. 5 is a top plan view of a hay baling machine showing my improved form of tying mechanism coöperating therewith. Fig. 6 is a plan view of an upper and a lower rack bar and a pair of tying needles positioned between said rack bars. Fig. 7 is a perspective view of the mechanism disclosed in Fig. 6. Fig. 8 is a detail elevation of the mechanism for cutting the wire after it has been tied. Fig. 9 is a plan view of the mechanism disclosed in Fig. 8 and also showing one of the tying needles in operative position. Fig. 10 is a detail elevation partly in section showing a peculiar notched ratchet wheel, and, Fig. 11 is a detail plan view of a disk having cutting notches arranged in its circumference.

Referring to the drawings in which similar reference numerals designate corresponding parts throughout the several views, 1 is the usual or preferred form of compartment employed in hay presses mounted upon wheels 2 and having a hopper 3 through which hay may be fed into said compartment. Although not shown, suitable means may be employed in connection with the hopper 3 to prevent hay from falling behind the plunger-head 4, and said plunger-head is moved longitudinally through the compartment 1 by means of the plunger 5, it being obvious that any form of power may be used to drive said plunger. As the plunger 5 is moved inwardly, the plunger-head 4 forces the hay into a baling compartment 6, said baling compartment being connected or integral with the compartment 1 and in alinement therewith.

A shaft 7 extends transversely of the compartment 1 and below the plunger 5, said shaft being also rotatably mounted in the bearings 8 and 8ª, the latter being secured on the vertical walls of the compartment 1. In the length of the shaft 7 and at a point adjacent the plunger 5 is a cog wheel 9, said cog wheel being designed to rotate with the shaft 7 and mesh in engagement with the rack bar 10, the latter being secured on the plunger 5 also having a plurality of notches adapted to register with the cogs on the cog wheel 9, so that when the plunger 5 is moved longitudinally through the compartment 1, the cog wheel 9 will be caused to rotate and in turn the shaft 7 will be rotated, likewise a sprocket wheel 11 mounted on a portion of the shaft 7 which extends beyond the compartment 1 will also be rotated. Adjacent the inner face of the sprocket wheel 11 is a collar 12 and integral with said collar is the male member of a suitable clutch 13, the female member of said clutch being integral with a collar 14, the latter being fixedly secured upon the shaft 7.

The clutch member 13 is normally held in operative position by means of a spring 15 which encompasses the shaft 7, one end of said spring bearing against the outer face of the sprocket wheel 11, while the other end thereof bears against an annular plate 16 secured on the outer end of the shaft 7. For the purpose of throwing the clutch member 13 to an inoperative position, a lever 17 fulcrumed upon the adjacent vertical wall of the compartment 1 is utilized to coöperate with a wedge member 18, the latter being designed to slide laterally in a bearing 19, said bearing being suitably positioned on a wall of the compartment 1. The wedge 18 is adapted to pass between the collars 12 and 14, and in so doing, will cause the clutch member to become engaged or disengaged, correspondingly as the wedge is moved outwardly or inwardly.

A suitable link chain 20 is adapted to coöperate with the sprocket wheel 11 and to communicate power to a corresponding sprocket wheel 21 mounted upon a shaft 22 and integral thereon, said shaft 22 being rotatably mounted in bearings 23 and 23$^a$, the latter being secured on the upper wall of the compartment 6.

The shaft 22 is the medium through which power is transmitted to the mechanism which performs a function of securing wire in engagement with the bale of hay, at just the proper moment. If desired, the shaft 22 may be operated by hand, by way of a wheel 24 fixed on the end of the shaft opposite the end on which is mounted the sprocket wheel 21.

Adjacent the sprocket wheel 21 and secured on the shaft 22 is a notched wheel 25, the notches on said wheel extending horizontally outward from the inner face thereof and for a portion of the circumference, the balance of the circumference being blank, while between the wheel 25 and the bearing 23$^a$ is a second notched wheel 26, the notches on said wheel being arranged for a portion of the distance around the circumference thereof, while the remaining part is blank, as shown on the wheel 25 and a third notched wheel 27 is positioned on the shaft 22 on the opposite side of the bearing 23$^a$ to the side on which is located the wheel 26, said last mentioned wheel having its circumference notched similarly to the wheels 25 and 26. The wheels 25, 26 and 27 are positioned on the shaft 22 in such a manner as to provide a means for rotating the shafts 28 and 29 having on one end respectively, bevel gears 30 and 30$^a$, the latter being designed to mesh in engagement with the notches carried on the wheels 25, 26 and 27. It will be seen that the arrangement of the notches on the wheels 26 and 27 are such that when the notches on the wheel 26 engage with the gear 30, the shaft 28 will be rotated in one direction, while when the notches on the wheel 27 mesh in engagement with the gear 30, the shaft 28 will be rotated in the opposite direction to the one just previously mentioned. Suitable bearing members 31 are provided for the shafts 28 and 29.

A bevel gear 32 similar to the one shown at 30, is provided on the opposite end of the shaft 28, said gear 32 being adapted to mesh in engagement with a bevel gear 33 carried on the toothed pinion 34, the latter being rotatably mounted on a shaft 35, seated in suitable bearings 36, and a toothed pinion 34$^a$ similar to the pinion 34 is provided on the opposite end of the shaft 35, each of said pinions being designed to operate corresponding notched rack bars 37 and 37$^a$, said rack bars being parallel and terminating in substantially L shaped members, which in turn are integral with a bar 37$^b$ upon which are secured the tying needles 38 and 38$^a$. The shaft 35 being mounted perpendicularly to the plane of the press and the pinions 34 and 34$^a$ extending at right angles to the shaft 35, the notched rack bars 37 and 37$^a$ registering with the teeth on the pinions 34 and 34$^a$, will cause said rack bars to move in a plane that is transverse to the plane of the pinions 34 and 34$^a$, and in so doing, will correspondingly direct the movement of the tying needles 38 and 38$^a$.

The first operation before the process of baling and securing hay commences, is to position a wire 39 which is carried on some suitable supplying member, in between the bevel notches of a disk 40, said disk being rotatably mounted upon a pin 41 or the like, and when the plunger-head is moved longitudinally into the baling compartment 6, said plunger-head will come in contact with the wire and force the same within said baling compartment, thus providing three sides of wire, after which the tying needles 38 and 38$^a$ are utilized to make the fourth side of wire by passing transversely of the bale of hay after it has been pressed within the baling compartment 6 and also the three sides of wire, after the first operation of positioning the wire 39 in engagement between a pair of the cogs on the disks 40, similar operations will be performed automatically thereafter, as will be explained more fully.

The shaft 29 has a bevel gear 42 on the end opposite to the gear 30$^a$, said bevel gear 42 being adapted to mesh in engagement with the corresponding bevel gear 43 carried on the toothed wheel 44 mounted upon a shaft 45, the teeth on the wheel 44 being designed to register with the peculiar, substantially pyramid shaped teeth of the wheel 46, said last mentioned wheel being rotatably mounted in a bearing 47, said last mentioned wheel also having a plurality of notches 48, said notches being designed to register with a channel portion 49 of the bearing 47. As the toothed wheel 44 revolves, the wire 39 carried by each of the tying needles 38 and 38ᵃ, positioned respectively adjacent the top and bottom of the bale, will be caused to drop in the notches 48 of the wheel 46 and the revolution of the latter wheel will cause the strands of wire positioned in the notches to revolve and in so doing become twisted in engagement for the purpose of securing the same. It is to be understood that a similar wheel to the one designated at 46, is provided for at the lower end of the bale and a notched disk similar to the one shown at 40, is also provided at the same point, the functions of one corresponding to the functions of the similar one positioned opposite.

In order to cut the wire after it has been twisted, a pair of knives 50 and 50ᵃ are pivotally mounted upon a frame 51, the latter having an inward extending member 52, the member 52 being so positioned as to come in contact with a lug 53 carried on the face of the toothed wheel 44, and as the latter rotates, the lug 53 will be brought in engagement with the inward extending member 52 of the frame 51 causing said frame to move the knives 50 and 50ᵃ upon their fulcrumed points 54 and 54ᵃ, thereby severing the twisted strands of wires.

The disks 40 are not only used to hold the wire in engagement between the beveled teeth cut in its periphery, but said beveled teeth are also designed to cut a portion of the wire that extends between the knives 50 and 50ᵃ and said disks, this last operation being brought about by means of the lug 53 of the toothed wheel 44 coming in contact with a right-angled extension 55 of the frame 56, each end of the frame 56 having parallel members 57 and 57ᵃ extending at right angles thereto, said last mentioned members being pivotally mounted upon the frame 56 and designed to operate pawls 58 and 58ᵃ, which in turn rotate the disks 40 for a space of one notch. The pawls 58 and 58ᵃ are ordinarily held out of engagement with the disks 40 by means of a spring 59 positioned respectively on the members 57 and 57ᵃ. As the disks 40 are rotated, the wire adjacent the inner face of said disks is severed leaving the portion on the other face held in engagement between the notches and the adjacent members 57 and 57ᵃ.

Each of the tying needles 38 and 38ᵃ have fulcrumed within each respectively a substantially L shaped finger 60, said finger having a channel portion along the outer edges to receive the wire 39 which is threaded in said tying needles, and as the latter are moved backward and forward by means of the rack bars 37 and 37ᵃ, one side of the L shaped finger which extends normally slightly without the needle, will come in contact with a standard 61, and in so doing, swing the other member of the L shaped finger in such a position as to direct the wire in between the notches of the disks 40 and also in engagement with the notches 48 of the wheel 46.

It will be seen from the foregoing that I have provided a novel means for twisting the wire in engagement with baled hay and also a means for supplying the wire for the purpose just mentioned. The combination of parts presented are such as may be attached to any type of baling press for hay, straw and the like and the arrangement of said parts is so definitely arranged as to positively provide for the coöperation of one part with another for the accomplishment of a predetermined amount of work.

The parts for transmitting power to the binding and tying mechanism are so arranged as to cause each of the latter parts to do its work at just the proper moment, thereby providing against the danger of entangling the wire used for binding purposes with the working parts of the mechanism.

What I claim is:—

1. In a baling press, a baling chamber, a plunger reciprocating therein, a pair of needles adapted to reciprocate transversely of said baling chamber, means operated by the reciprocation of said plunger to operate said needles, said needles being threaded with a strand of wire, respectively, a frame extending beyond said baling chamber, means on said frame adapted to twist the wire carried by said needles, knives pivotally mounted on said frame and adapted to cut the wire after the same has been twisted, a toothed wheel operating in conjunction with said twisting means, and means on said wheel to operate said knives at a predetermined point in the rotation thereof.

2. In a baling press, a baling chamber, a plunger reciprocating therein, a rack on the plunger, a transverse shaft, a gear wheel thereon meshing with the rack, a sprocket wheel on the shaft, a transverse shaft at the end of the chamber, a sprocket wheel thereon, a sprocket chain connecting the two sprocket wheels, a frame comprising two parallel racks and two parallel needles, a shaft, two gears thereon meshing with the racks, and connections between the last named shaft and the sprocket wheel shaft last named, whereby the former is operated from the latter to reciprocate the needles.

3. In a baling press, a baling chamber, a plunger therein, a transverse shaft at the end of the chamber, two mutilated crown gears on the shaft, a longitudinal shaft, a bevel gear on one end thereof adapted to alternately mesh with the two mutilated gears, a bevel wheel on the opposite end of the longitudinal shaft, a vertical shaft carrying two gear wheels and a bevel wheel engaging the bevel wheel on the longitudinal shaft, and a frame comprising two parallel needles and two parallel racks, the latter engaging with the gear wheels on the last named transverse shaft.

4. In a baling press, wire carrying needles, means for reciprocating them transversely of the chamber, means for twisting the wire comprising notched wheels on the side of the chamber, means carried by the needles to place the wire in the notches, means comprising pawls for turning the notched wheel, a frame carrying the pawls for opposite wheels, and having an inward extension, and a wheel carrying a pin for engaging the extensions to move the frames.

5. In a baling press, a gear wheel carrying a lateral pin, a bar having an inward lateral extension to engage said pin as the wheel rotates, pivoted lever knives connected at their ends to the opposite ends of the bar, and cutting wheels coacting with said knives.

In testimony whereof I have signed my name to this specification in the presence of two subscribing witnesses.

ANDY TINKER.

Witnesses:
H. W. MORGAN,
R. L. LAWRENCE.

---

Copies of this patent may be obtained for five cents each, by addressing the "Commissioner of Patents, Washington, D. C."